Inventor:
Alfred Ferrari
Adolf Panes

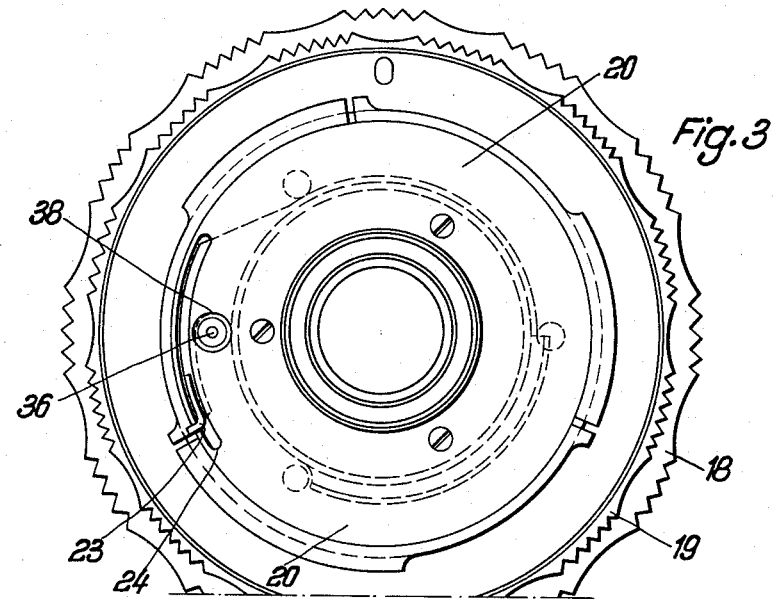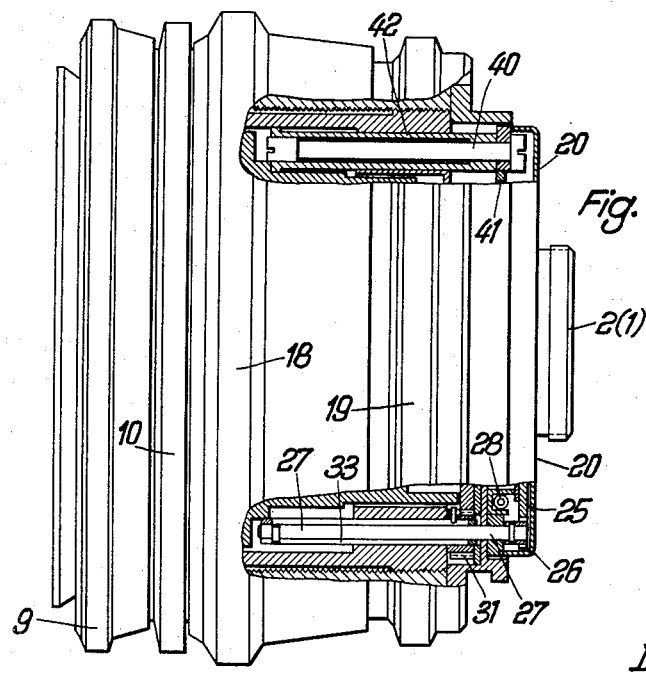

Jan. 24, 1961  A. FERRARI ET AL  2,969,008
LENS, PARTICULARLY REPLACEABLE LENS FOR REFLEX CAMERAS
Filed Dec. 8, 1958  3 Sheets-Sheet 3

Inventor:

United States Patent Office 2,969,008
Patented Jan. 24, 1961

---

2,969,008

LENS, PARTICULARLY REPLACEABLE LENS FOR REFLEX CAMERAS

Alfredo Ferrari and Adolf Gasser, Mauren, Italy, assignors to Contina Bureau- und Rechenmaschinenfabrik Aktiengesellschaft, Mauren, Liechtenstein Filed Dec. 8, 1958, Ser. No. 778,789

Claims priority, application Germany Dec. 17, 1957

12 Claims. (Cl. 95—64)

The present invention is based on the recognition of the requirement for lenses, particularly of replaceable lenses for reflex cameras, which lenses may be used for photographs taken at long as well as very short distances so that even small objects such as insects, crystals, jewelry, etc., can be imaged in full size or even oversize, if desired, without requiring changes to be made in the lens by the insertion of interposed rings, bellows or the like.

In order to meet these requirements, a lens, particularly a replaceable lens for reflex cameras, has already been proposed, in which the optical system is disposed in the extension tube of a sunshield-like hollow body, the larger base of which has attached thereto a barrel part of the holder which forms a part of the screw drive whereas the other parts of the holder lie in the cavity which is formed by the barrel. The diameter of the barrel and the extension length of the screw drive are determined by the funnel-shaped enlargement to enable a continuous focusing of the lens between infinity and 0.1 meter with the aid of a single screw drive whereas the use of two screw drives enables the smallest distance between the lens and the object to be restricted to a few centimeters.

The present invention is based on the further recognition that the basic advantages thus achieved can be further increased. In the first place the proposed arrangement causes the optical system to rotate about its optical axis. This is undesirable for various reasons. Above all, it is hardly possible to give the optical system such a perfect optical symmetry that the system can be rotated about its optical axis without occurrence of small non-symmetries, which are imaged. For this reason it is desired to provide a general arrangement in which the optical system performs only axial movements but is not rotated about its optical axis. Another problem resides in providing a substantial increase in the extension beyond the distance previously achieved in order to enable a focusing of the lens within a maximum range. Nevertheless it should be possible to provide such a lens with a spring-type diaphragm, which in a development of the invention is so constructed that it is set and released from the camera side so that there is no need for undesired manipulations on the mechanically and optically sensitive lens.

Based on lenses, particularly replaceable lenses for reflex cameras, in which the optical system is disposed in the extension tube of a sunshield-like hollow body, the larger base of which has attached thereto a barrel part of the lens holder, which barrel forms a part of the screw drive whereas the other holder parts are disposed in the cavity enclosed by the barrel, the lens proposed to solve the problem set forth is characterized according to the invention in that straight-line guiding means are provided between the connecting member of the lens on the camera side and the nut member having the smallest screw thread diameter of the screw drive, which guiding means consist of telescoped parts and prevent a rotation of the nut member and with it of the optical system about the optical axis. Besides, the lens is provided at its connecting member on the camera side with means for effecting a temporary full opening of the diaphragm preferably in dependence on the actuation of the quick-setting member for the shutter of the camera, and for reestablishing the preselected diaphragm aperture, particularly in dependence on the release of the shutter. To this end, length-variable gear shafts for transmitting the adjusting movements may be provided between a shutter-setting ring which serves for initiating the opening of the diaphragm and the iris ring of the diaphragm. One of these gear shafts may comprise a driver pin, which engages the slot of a shaft sleeve concentrically surrounding the shaft, which sleeve has at least one additional slot, which receives a driver pin of the gear which receives and transmits the adjusting movement. In this way the necessary diaphragm adjusting, setting and releasing movements are effected from the camera side and are not hindered by the highly variable lens lengths and the proposed motion transmitting means do not require a space which would involve an increase in the size of the lens holder and of other dimensions of the lens. If it is not desired to provide for a fully automatic operation of the spring-type diaphragm from the camera side the means for effecting a temporary full opening of the diaphragm may also be provided on the end member of the lens remote from the camera. The release of the spring-type diaphragm, i.e., the opening of the diaphragm to the preselected aperture, will suitably also be effected from the camera side in this case so that a semi-automatic operation of the spring-type diaphragm is obtained.

The drawing shows an embodiment of the invention with reference to an example residing in a lens provided with three driving screw threads.

Fig. 2 is an outside view, partly in section, showing the lens focused at infinity.

Fig. 3 is an end view showing the end face of the lens on the camera side.

Figure 1:
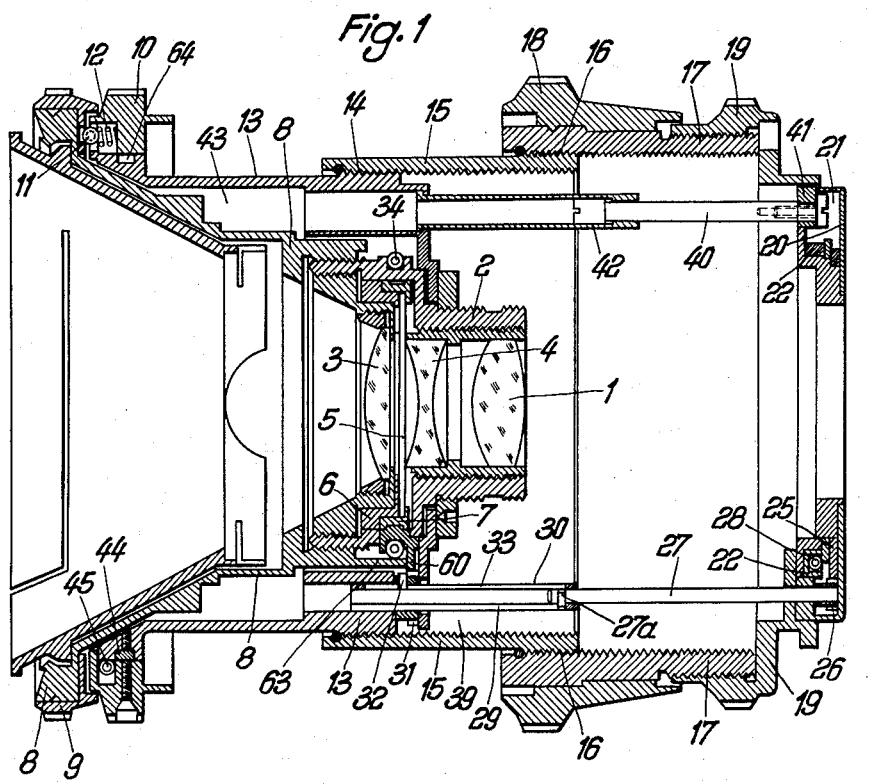
Fig. 1 shows the lens in fully extended condition.
Figure 4:
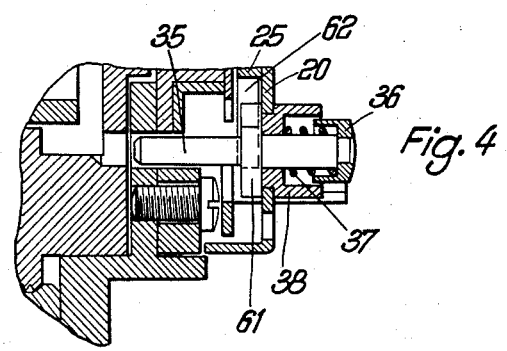
Fig. 4 illustrates the release for the spring-type diaphragm, which release is provided on the camera side.

In Figs. 1 to 4, 1 is the optical system, which is accommodated in the holder part 2. The leaves (not shown) of the diaphragm are disposed at 5 between the front lens member 3 and the lens member 4. 6 is the bearing ring for the leaves whereas 7 is the iris ring. Besides, 8 is the diaphragm ring, on which diaphragm preadjusting ring 9 is arranged which is used for preselecting the aperture of the diaphragm. Opposite to the rings 8, 9 the detent ring 10 is disposed, which facilitates the setting of the preselected diaphragm adjustments by means of the detent ball 11 and its loading spring 12. The lens barrel 13 is designed as a nut member of smallest diameter and forms at 14 the inner screw thread, which is in threaded engagement with the intermediate ring 15. The latter is provided at 16 with the outer screw thread in threaded engagement with the screw-threaded member 17, which carries a distance setting ring at 18. The angular range through which the screw-threaded member 17 is adjustable with the distance setting ring 18 suitably does not exceed 360°. The connecting ring for the camera is designated 19. It serves only as a bearing ring and is in threaded engagement with the screw-threaded member; these screw threads are the least expensive and simplest type of bearing. The screw threads between the screw-threaded member 17 and the connecting ring 19 have a pitch of only 0.5 mm. so that the screw-threaded member 17 is moved only 0.5 mm. from or to the camera relative to the connecting ring 19 when the screw-threaded member 17 is caused to make one full revolution to extend or retract the lens. The connecting ring 19 receives the setting ring 22 in a housing 21, which is closed by the cover 20. This setting ring has a lug 23 (see Fig. 3) extending through a slot 24 of the cover 20 and registering with a movable stop in the camera. This stop is actuated by the quick-setting member for the shutter. This lug serves to move the spring-type diaphragm to its fully open position by setting it against the action of a spring. The setting ring 22 transmits its movements to the setting segment 25, which meshes with a pinion 26 carried by the shaft 27. A spring 28 accommodated in an appropriately shaped portion of the setting ring 22 ensures an automatic return of the setting ring 22 to its initial position. The shaft 27 carries at 27a a cross-pin, the free end of which is guided in a slot 29 of the sleeve 30, which concentrically surrounds the shaft 27. The gear 31 longitudinally slidably mounted on the sleeve has a pin 32, which engages another slot 33 in the shaft sleeve 30. Thus, the gear 31 receives the movement for effecting a full opening of the diaphragm from the setting ring 22 through the intermediary of the setting segment 25, pinion 26, shaft 27, pin 27a, slot 29, slot 33 and pin 32. A spring 34 biases the entire arrangement. The resulting drive movement is transmitted by the gear 31 to the setting segment 60, which acts on the iris ring 7 to cause the necessary movements of the leaves. This movement depends on the position of a pin 35 which is guided in the shaft 38 and spring-cushioned at 37 (Fig. 4) and has a release button 36. As will be explained in conjunction with Fig. 5, this release button is pressed when the shutter of the camera is released. Thereby the diaphragm is moved to the aperture which has been preselected by the diaphragm preadjusting ring. The movement of the diaphragm to its fully open position by means of the setting ring 22, which is rotated by means of a quick-setting member 47, shown in Fig. 5, against the action of spring 28, is limited thereby that in the end position of the diaphragm setting movement the pin 35 visible in Fig. 4 springs with its annular stop 61 into the recess 62 in the setting segment 25. During the foregoing actuation of the spring-type diaphragm this pin was moved by the plunger 53 (Fig. 5) to lift the stop 61 out of the recess 62. When the stop 61 has sprung into the opening 62 of the setting segment 25 the spring-type diaphragm has been set and fully opened from the camera side. Before the quick-setting member has been actuated, the illumination has been measured and the necessary diaphragm aperture has been determined. The preselection of the diaphragm aperture is effected by means of the diaphragm adjusting ring 8, which is moved relative to the detent ring 10. The detent ball 11 spring-cushioned at 12 snaps into that recess which is aligned by the operator with ball 11 and which corresponds to the preselected diaphragm aperture. The movement of the diaphragm adjusting ring is transmitted by those parts of the cone member 8 which are on the right in Fig. 1 to a lug 63. This preselection of the diaphragm aperture causes the lug 63 to assume a certain angular position with respect to a vertical plane through the optical axis. The setting segment 60 has also a stop, not shown. When the shutter is released by actuation of the push button 56 and of the associated other releasing elements, which will be described in conjunction with Fig. 5, this movement will be transmitted to the release button 36 (Fig. 4) and the flange 61 will leave the recess 62. This causes all elements coupled to the setting segment 25 and mentioned hereinbefore to perform a movement opposite to the movements performed by the same parts during the afore-described setting operation. This means that the stop (not shown) of the setting segment 60 engages the stop 63. Thus, the moved parts come to rest in a position in which the diaphragm has the preselected aperture.

The use of two adjustable rings, namely, the bearing ring 6 for the leaves and the iris ring 7 enables an exact calibration of the diaphragm apertures with the aid of a gauge during manufacture. The bearing ring 6 for the leaves carries the bores for the leaf pins whereas the iris ring is formed with milled recesses for receiving the leaves. The bearing ring for the leaves is located by means of a screw-threaded pin carried by the stationary lens tube 2 when the diaphragm has been calibrated.

In order to prevent a rotation of the nut member 13 and with it of the optical system 1 in spite of the arrangement of the screw threads 14, 16, telescopic straight-line guiding means are provided in the cavity 39 between the holder part 2 and the barrel 17, 18, 19 largest in diameter. These guiding means comprise the telescopic part 40 smallest in diameter, which is screwed to the inner end wall 41 of the casing 21. The outer telescopic tube 42 is rigidly connected to the nut member 13 having the smallest focusing screw thread 14 and is vented to the cavity 43 so that the movement cannot be obstructed. Because the space 43 is substantially closed toward the outside this enables the adjustment of a larger or smaller braking effect on the axial movement to prevent unnecessary deformations by tampering with the lens.

Whereas the setting and release of the diaphragm from the camera side are effected in automatic dependence on the actuation of the quick-setting member 47 and of the release member 56, a semi-automatic operation is also possible, in which the spring-type diaphragm is set by hand, by a separate movement independent of the operation of the quick-setting member 47 whereas the release is again automatically effected by a release button 56. To enable the diaphragm to be set by hand the detent ring 10 is provided, which drives the cone member 8 by means of a stop 44 in the groove 64 and acts on the stop (not shown) of the setting segment 60. In the end position of the detent ring 10 the annular stop 61 lies opposite to the recess 62 so that the setting segments 25 and all parts which are rigidly connected thereto and moved therewith are automatically locked. After the diaphragm has thus been set, the aperture of the diaphragm is preselected by a rotation of the diaphragm adjusting ring 8 relative to the detent ring 10. A release at 36 will then cause all parts to move to the position which corresponds to the preselected diaphragm aperture to which the diaphragm is then opened thereby that a tension spring 45 arranged in a recess of the detent ring 10 returns the detent ring 10 together with the preadjusting ring 9 to the position to which they have been adjusted in preselecting the diaphrgam aperture. It is possible, therefore, to provide the means for setting the spring-type diaphragm at the end of the lens remote from the camera and to set the spring-type diaphragm with the quick-setting member as well as by hand.

Figure 5:
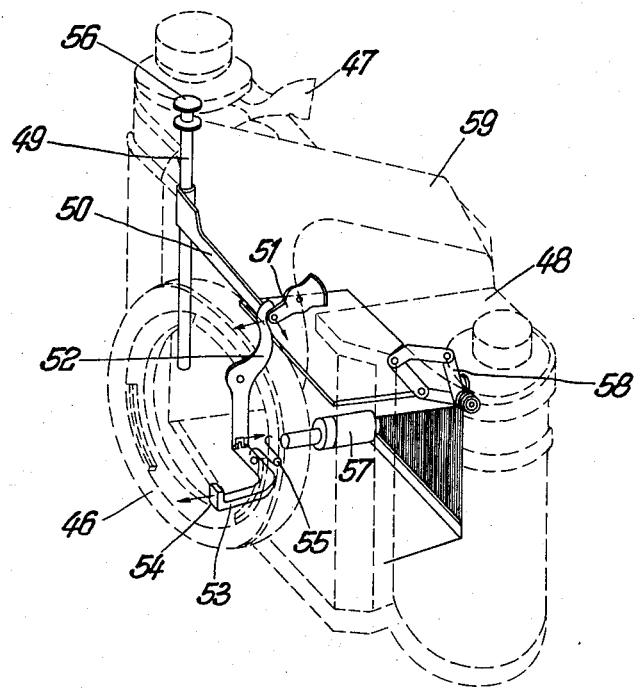
Fig. 5 shows the releasing means for the spring-type diaphragm, which means is provided on the appertaining camera.

Fig. 5 shows the arrangement on the camera side. The connecting ring 46 for the connecting ring 19 of the lens is seen. A bayonet joint is provided, which may be replaced by a screw thread, spring-loaded latch means or the like. 47 is the quick-setting member of the camera, the body 48 of which is only partly indicated. The quick-setting member 47 acts on a peripherally rotatable stop (not shown) adjacent to the ring 46, which engages the lug 23 of the setting ring 22 during the setting of the shutter and the transport of the film. In this case the spring-type diaphragm is automatically set at the same time. It is pointed out that this means for setting the spring-type diaphragm from the camera side is independent of the construction of the lens. The shutter release 49 acts in the usual manner on the shutter and acts also through the intermediary of the arm 50, lever 51, link 52 and plunger 53 with the stop face 54 on the release knob 36 of the setting means for the spring-type diaphragm. As a result, the spring-type diaphragm is released immediately before the release of the shutter. Thereby the diaphragm opens to the preselected aperture, which is effective during exposure. A hairpin spring 55 is so constructed and arranged that it tends to retract the plunger 53 toward the camera. Only when the push button 56 is actuated is the spacing of the stop face 54 from the camera body 48 increased so that the stop face 54 actuates the release button 36 for the spring-type diaphragm on the lens. Further means 57, 58 are provided to ensure that a light cell, not shown, lies parallel to the exposure plane when the diaphragm is in its preadjusted position so that the actual amount of incident light is measured whereas during focusing a mirror, not shown, of the illustrated reflex camera directs the incident light through the fully opened diaphragm to the reflex view finder 59. The light cell as well as the mirror are moved out of the path of rays by the beginning of the movement of the release button 56. The means 49—54 then ensure that the diaphragm assumes the preselected aperture throughout the exposure of the film.

What is claimed is:

1. In an interchangeable lens unit adapted to be removably attached to a camera, in combination, an inner tube having exterior threads; lens holding means carried by said inner tube at least partly in the interior of said inner tube; an outer tube having interior threads, said outer tube and inner tube being coaxial with respect to each other and with respect to the optical axis; at least one intermediate tube having inner threads receiving the outer threads of said inner tube and having outer threads receiving the interior threads of said outer tube; attaching means for attaching the lens unit to a camera, said attaching means supporting said outer tube for rotation and said attaching means being stationary after being joined to a camera; means connected with said attaching means and said inner tube for preventing rotation of the latter relative to the optical axis while guiding said inner tube only for axial movement along the optical axis; and manually engageable means connected only with said outer tube for turning the latter with respect to said attaching means so as to set the position of said inner tube along the optical axis for focusing purposes, said inner tube being displaced along said optical axis only by turning of said outer tube transmitted to said inner tube through said intermediate tube.

2. In a lens unit as recited in claim 1, said attaching means having a threaded connection with said outer tube so that the latter together with said intermediate and inner tubes move along said axis during turning of said outer tube with respect to said attaching means.

3. In a lens unit as recited in claim 2, said outer tube being turnable through no more than 360° with respect to said attaching means.

4. In a lens unit as recited in claim 1, said intermediate tube covering at all times the exterior threads of said inner tube and said outer tube covering at all times the outer threads of said intermediate tube so that none of the threads are ever exposed.

5. In a lens unit according to claim 1, said means for preventing rotation of said inner tube including at least two telescoped members extending parallel to the optical axis and respectively connected with said inner tube and said attaching means.

6. In a lens unit as recited in claim 5, said telescoped members including an inner rod fixed to said attaching means and an outer telescoped tube receiving said inner rod in its interior, said inner tube having an end wall formed with an opening through which said telescoped tube slidably extends.

7. In a lens unit as recited in claim 6, said telescoped tube communicating with an inner chamber of said inner tube which has restricted communication with the outer atmosphere so that movement of said telescoped tube into and out of said chamber is resisted by the flow of air out of and into said chamber.

8. In a lens unit as recited in claim 1, diaphragm means carried by said lens holding means; manually releasable means carried by said attaching means for releasably holding said diaphragm means in a fully open position until said releasable means is manually released; and transmission means connected to said attaching means and said inner tube and cooperating with said manually releasable means and said diaphragm means for transmitting movement of said manually releasable means to said diaphragm means, said manually releasable means when released acting through said transmission means on said diaphragm means to close the diaphragm.

9. In a lens unit as recited in claim 8, manually operable selecting means carried by said inner tube for preselecting the size of the exposure aperture provided by the diaphragm, said manually operable selecting means cooperating with said diaphragm means to limit the extent to which the latter is closed upon release of said manually releasable means.

10. In a lens unit as recited in claim 8, said transmission means including a shaft turnably carried by said attaching means, turned by said manually releasable means, and extending parallel to the optical axis from said attaching means toward said inner tube, and a transmission tube turnably carried by said inner tube coaxial with said shaft and operatively connected to said diaphragm means for actuating the latter, said transmission tube receiving said shaft slidably in the interior of the latter tube and said transmission tube being formed with an elongated axial cutout, said shaft carrying a projection which extends into said cutout for slidable movement therealong so that rotary movement of said shaft is transmitted to said transmission tube.

11. In a lens unit as recited in claim 8, said manually releasable means having a portion projecting rearwardly from said attaching means and adapted to be moved forwardly for releasing said manually releasable means.

12. In a camera, in combination, a lens unit as recited in claim 8, a camera housing to which said attaching means is attached; and manually operable means carried by said camera housing and cooperating with said manually releasable means for releasing the latter upon actuation of said manually operable means by the operator.

References Cited in the file of this patent

UNITED STATES PATENTS

| | | |
|---|---|---|
| 2,231,730 | Mihalyi | Feb. 11, 1941 |
| 2,279,476 | Mihalyi | Apr. 12, 1942 |
| 2,612,093 | Schütz | Sept. 30, 1952 |
| 2,716,930 | Marson | Sept. 6, 1955 |
| 2,805,609 | Nerwin | Sept. 10, 1957 |